Patented Mar. 30, 1954

2,673,840

UNITED STATES PATENT OFFICE 2,673,840

THIOPHENATED KETONES AND MINERAL OIL COMPOSITIONS CONTAINING THE SAME

Orland M. Reiff and Alfred P. Kozacik, Woodbury, N. J., assignors to Socony-Vacuum Oil Company, Incorporated, a corporation of New York No Drawing. Application December 29, 1949, Serial No. 135,834

4 Claims. (Cl. 252—48.2)

This invention relates to improved lubricating compositions. More particularly, the invention is concerned with mineral lubricating oil compositions containing thiophenated ketones as oxidation and corrosion inhibitors.

As is well known, mineral lubricating oils tend to decompose, especially under heat and oxidizing conditions, such as those encountered in use in internal combustion engines. The decomposition products formed in the oil are acidic in nature and exert a corrosive action upon the metal surfaces being lubricated. The present invention is concerned with a novel class of chemical compounds which are highly effective in counteracting the tendency of lubricating oil to oxidize and thus corrode the metal surfaces.

We have discovered that thiophenated aliphatic ketones, produced by reacting aliphatic ketones having one or two monoolefinic aliphatic groups with thiophene, are excellent addition agents for stabilizing mineral lubricating oils against the deleterious effects of oxidation.

It is, therefore, the primary object of this invention to provide lubricating oil compositions containing these new anti-oxidant compounds. Other objects will become apparent as the description of the invention proceeds.

As far as is known, the thiophenated aliphatic ketones of this invention have not been known heretofore and are, therefore, considered to be new compositions of matter.

As already indicated, the thiophenated aliphatic ketones of the invention are produced from unsaturated aliphatic ketones by thiophenation of the olefinic bonds thereof. If the ketone is a diolefinic ketone, one or both of the olefinic bonds may be thiophenated.

The ketones contemplated for use in the invention conform to the general formula

wherein the R's represent either an alkyl or an alkenyl group, at least one being an alkenyl group. By "alkenyl" we mean a monovalent aliphatic radical having a double bond therein, for example, —CH₂—CH=CH—CH₃. The ketone may have from 4 up to about 35 carbon atoms and may be either straight- or branch-chained. As non-limiting examples of suitable ketones, there may be mentioned methyl vinyl ketone (butenone), allyl acetone (5-hexen-2-one), mesityl oxide (4-methyl-3-penten-2-one), phorone (2,6-dimethyl-2,5-heptadien-4-one), octyl octenyl ketone, dioctenyl ketone, vinyl wax ketone, octyl dodecenyl ketone, tetradecyl octadecenyl ketone, ditetradecenyl ketone, dioleyl ketone (oleone).

The reaction between the unsaturated aliphatic ketone and the thiophene may be readily effected in the presence of a synthetic silica-alumina type catalyst. We have found that such a catalyst, containing, for example, about 87.5% (by weight) of silica and about 12.5% of alumina is most satisfactory. We have found that by the use of such a catalyst no polymer products are formed as occurs by the use of other catalysts such as AlCl₃, ZnCl₂, or the like. In conducting the reaction, the reactants and the catalyst are mixed together and heated at a temperature of from about 300° F. to about 600° F. for a period of from about 1 to about 15 hours. Generally, sufficient thiophene is employed in order to provide at least one mol of thiophene for each olefinic bond in the ketone reactant. However, it is preferred to use an excess of thiophene, over the stoichiometrical amount. The reaction product is readily separated from the catalyst and unreacted thiophene by distillation and filtration. A monothiophenated product of a diolefinic ketone may be prepared by using only a slight excess over 1 mol of thiophene per mol of the diolefinic ketone. Although the final product in this instance will most probably contain minor amounts of dithiophenated ketone the monothiophenated product can be readily separated from the dithiophenated product by fractionation. However, for the purpose of the present invention, such separation is not necessary since both the mono- and dithiophenated aliphatic ketones are effective anti-oxidants for mineral lubricating oils. Accordingly, a product containing a mixture of mono- and dithiophenated ketones may be used as such for addition to the mineral lubricating oil.

The reaction between the unsaturated aliphatic ketone and thiophene is considered to take place at the olefinic bond (or bonds) of the ketone as follows:

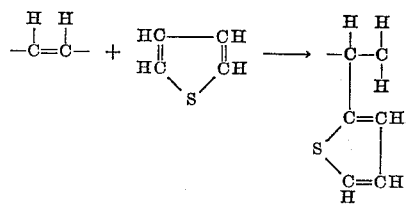

to give a mono-, or a dithiophenated ketone product, depending upon whether the unsaturated ketone contains one or two alkenyl groups and upon the amount of thiophene used in the reaction.

The thiophenated aliphatic ketones of the invention may, therefore, be represented by the general formula

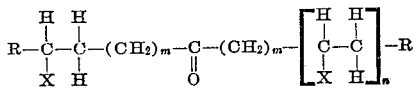

wherein, X is a thienyl group, R is an alkyl radical having from 1 to 10 carbon atoms, $m$ is a whole number from 0 to 10 and $n$ is a whole number selected from 0 and 1, the total number of carbon atoms in said thiophenated ketone being from 4 to about 35, exclusive of thienyl carbons.

In order to illustrate the method of preparation of our thiophenated aliphatic ketones and their effectiveness as antioxidants in lubricating oil compositions, the following specific examples and test results are given.

EXAMPLE I

Three hundred and twenty grams (0.638 mol) of oleone (iodine No. 78), 198 grams (2.36 mols) of thiophene and 51 grams of synthetic silica-alumina catalyst were placed in a 2.8 liter shaker bomb and heated at 500° F. for 7 hours. After the bomb had cooled to room temperature, the contents were removed by addition of benzene, the catalyst was removed by suction-filtration through a layer of filter-aid. The filtrate was placed in a distillation flask, the benzene distilled off, the product remaining was topped to 275° F. at 7 mm., to make certain no light products remained. The residual product amounted to 394 grams; analysis showed 7.72% sulfur (theo.=7.38% for a product of dithiophenated oleone of 78 iodine number). This product (product I) is, therefore, considered to be substantially entirely dithiophenated oleone, i. e.

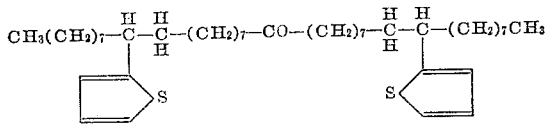

EXAMPLE II

Three hundred and twenty grams (.638 mol) of oleone (iodine number theor. 101; found 101), 198 grams (2.36 mols) of thiophene, and 51 grams of a synthetic silicate catalyst were heated and processed as above. The residual product had a sulfur content of 8.31% as compared to the theoretical value of 9.55% for the dithiophenated product of oleone of 101 iodine number. As in Example I, this product (product II) is considered to be essentially dithiophenated oleone.

Antioxidant action

The following test results will serve to illustrate the effectiveness of the thiophenated ketone type compounds of the invention, as antioxidants in mineral lubricating oils. The dithienyl oleone obtained in Example I, above, was blended in minor proportions with a typical mineral lubricating oil, viz. Olean 10. This is a solvent-refined oil of 45 S. U. V. at 210° F. The blends were then tested by means of the Lauson Engine Oxidation Stability Test. This test determines oil deterioration as measured by increase in neutralization number (N. N.). The procedure is as follows: The test is carried out in a single cylinder, liquid cooled, Lauson engine operated continuously over a time interval of 36 hours. During the test, the cooling medium is held at a temperature of about 212° F. and the oil temperature at 250–260° F. The engine speed is maintained at 1815 R. P. M. The N. N. and viscosity of the test oil and the preceding blank oil are reported for 12, 24 and 36 hours. The results of these tests were as follows:

| Conc. (by wt.) in Olean 10 | Kin. Vis. @ 210° F., cs. | | | Neutralization Number | | |
|---|---|---|---|---|---|---|
| | 12 Hrs. | 24 Hrs. | 36 Hrs. | 12 Hrs. | 24 Hrs. | 36 Hrs. |
| Previous Blank | 5.91 | 6.68 | 8.57 | 1.1 | 4.0 | 11.6 |
| 2½% Product I | 6.02 | 6.29 | 6.76 | 1.0 | 1.6 | 3.6 |
| Previous Blank | 5.97 | 7.19 | 10.10 | 1.7 | 5.6 | 14.8 |
| 5% Product I | 6.03 | 6.24 | 6.54 | 0.5 | 0.9 | 2.1 |

That the additives of the invention very effectively prevent oxidation of mineral lubricating oils under conditions of actual use in an internal combustion engine is shown by the low viscosity and N. N. of the blended oils as compared to the unblended oils.

The amount of thiophenated aliphatic ketone added to the mineral oil will vary somewhat with the intended application of the oil composition, and generally will be from about $\tfrac{1}{10}$% to about 10% by weight. However, the preferred amount is from 2½% to 5%. It is further contemplated that the product compounds be incorporated in the oil in greater amounts, i. e. above about 10%, to provide oil "concentrates" for marketing. These concentrated compositions have the advantage of affording a readily soluble form of the additive materials for dilution with additional amounts of oil prior to actual use.

The oils in which our new addition agents are used, or the oil "concentrates," may also contain other additives, designed to improve the character of the oil in other respects, such as detergency, V. I., pour point, etc.

Although the principles of this invention have been illustrated herein by means of certain specific examples and tests, it is not intended that the scope of the invention be limited thereby, but only as indicated in the following claims.

We claim:

1. A mineral lubricating oil containing a minor proportion, sufficient to inhibit the deleterious effects of oxidation thereof, of a thiophenated aliphatic ketone represented by the general formula

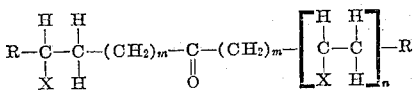

wherein, X is an unsubstituted thienyl group, R is an alkyl radical having from 1 to 10 carbon atoms, $m$ is a whole number from 0 to 10 and $n$ is a whole number selected from 0 and 1, the total number of carbon atoms in said thiophenated ketone being from 4 to about 35, exclusive of thienyl carbons.

2. A mineral lubricating oil containing a minor proportion, from about 0.1% to about 10%, of a thiophenated aliphatic ketone represented by the general formula

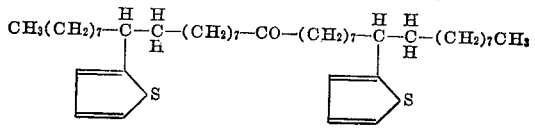

wherein, X is an unsubstituted thienyl group, R is an alkyl radical having from 1 to 10 carbon atoms, $m$ is a whole number from 0 to 10 and $n$ is a whole number selected from 0 and 1, the total number of carbon atoms in said thiophenated ketone being from 4 to about 35, exclusive of thienyl carbons.

3. A mineral lubricating oil containing a minor proportion, sufficient to inhibit the deleterious effects of oxidation thereof, of the compound

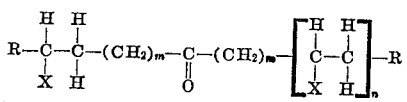

4. A mineral lubricating oil containing a minor proportion, sufficient to inhibit the deleterious effects of oxidation thereof, of the compound

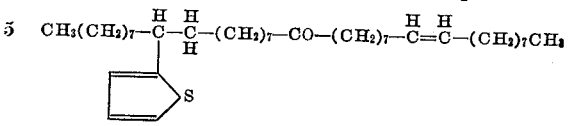

ORLAND M. REIFF.
ALFRED P. KOZACIK.

References Cited in the file of this patent

UNITED STATES PATENTS

| Number | Name | Date |
|---|---|---|
| 2,101,560 | Ralston | Dec. 7, 1937 |
| 2,419,586 | Otto et al. | Apr. 29, 1947 |
| 2,479,513 | Richter et al. | Aug. 16, 1949 |
| 2,497,145 | Terry et al. | Feb. 14, 1950 |
| 2,528,773 | Norris | Nov. 7, 1950 |
| 2,540,093 | Brooks | Feb. 6, 1951 |